US007842894B2

(12) United States Patent
Borst

(10) Patent No.: US 7,842,894 B2
(45) Date of Patent: Nov. 30, 2010

(54) BUCKLE FOR A SAFETY BELT

(75) Inventor: Peter Borst, Unlingen (DE)

(73) Assignee: Rolf Prettl, Tuebingen (DE)

( * ) Notice: Subject to any disclaimer, the term of this patent is extended or adjusted under 35 U.S.C. 154(b) by 149 days.

(21) Appl. No.: 12/034,777

(22) Filed: Feb. 21, 2008

(65) Prior Publication Data
US 2008/0141505 A1   Jun. 19, 2008

Related U.S. Application Data

(63) Continuation of application No. PCT/EP2006/007919, filed on Aug. 10, 2006.

(30) Foreign Application Priority Data

Aug. 23, 2005   (DE) .................. 10 2005 041 029

(51) Int. Cl.
*H01H 3/16* (2006.01)
(52) U.S. Cl. ................. 200/61.58 B; 200/61.58 R
(58) Field of Classification Search .......... 200/61.58 R, 200/61.58 B
See application file for complete search history.

(56) References Cited

U.S. PATENT DOCUMENTS

| | | | | |
|---|---|---|---|---|
| 4,001,532 A | * | 1/1977 | Kubota et al. | 200/61.58 B |
| 4,015,094 A | * | 3/1977 | Gavagan et al. | 200/61.58 B |
| 4,306,210 A | | 12/1981 | Saur | |
| 4,754,105 A | * | 6/1988 | Doty et al. | 200/61.58 B |
| 4,920,620 A | * | 5/1990 | Yamamoto et al. | 24/641 |
| 4,978,818 A | * | 12/1990 | Rothlin | 200/406 |
| 5,970,587 A | * | 10/1999 | Knox | 24/633 |
| 6,423,918 B1 | * | 7/2002 | King et al. | 200/406 |
| 2004/0140890 A1 | * | 7/2004 | Hartmann et al. | 340/457.1 |
| 2005/0146420 A1 | | 7/2005 | Ebert | |
| 2008/0035462 A1 | * | 2/2008 | Yanai et al. | 200/406 |

FOREIGN PATENT DOCUMENTS

| | | |
|---|---|---|
| DE | 2759251 A1 | 7/1979 |
| DE | 29510590 U1 | 12/1996 |
| DE | 19907716 A1 | 8/2000 |
| DE | 20204318 U1 | 9/2002 |

OTHER PUBLICATIONS

International Seach Report dated Dec. 6, 2006, mailed Dec. 21, 2006 for PCT Application Serial No. PCT/EP2006/007919, 3 pages.

* cited by examiner

*Primary Examiner*—Renee Luebke
*Assistant Examiner*—Lisa Klaus
(74) *Attorney, Agent, or Firm*—Turocy & Watson, LLP

(57) ABSTRACT

A seat belt buckle for seat belts has a housing, an opening for inserting a seat belt tongue, a locking device for locking the seat belt tongue, and a release device for releasing the seat belt tongue from the lock. A sensor device electrically senses whether the seat belt tongue is locked, wherein the sensor device has a switch arrangement which can be activated by the seat belt tongue. The switch arrangement has an electrically conductive snap-action plate that can be moved between a first switched position and a second switched position. A mechanical activation device transmits a force exerted on the seat belt tongue during the insertion of the seat belt tongue onto the snap-action plate in order to move the snap-action plate from the first switched position into the second switched position. As a result, an electrical contact element is closed or opened.

17 Claims, 3 Drawing Sheets

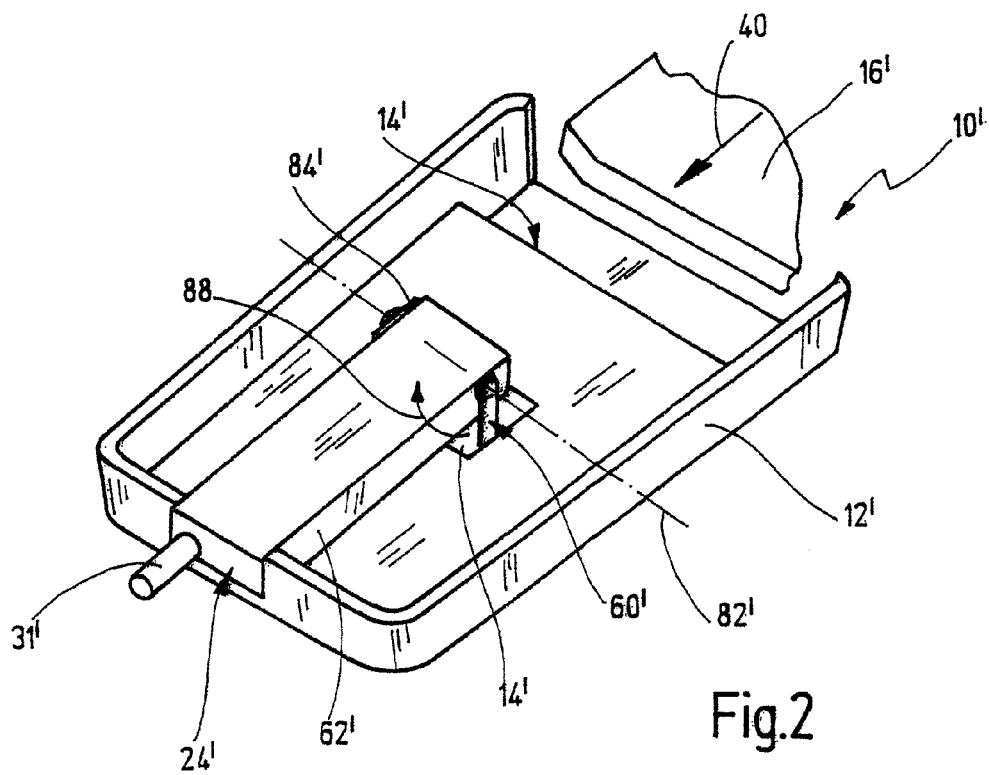
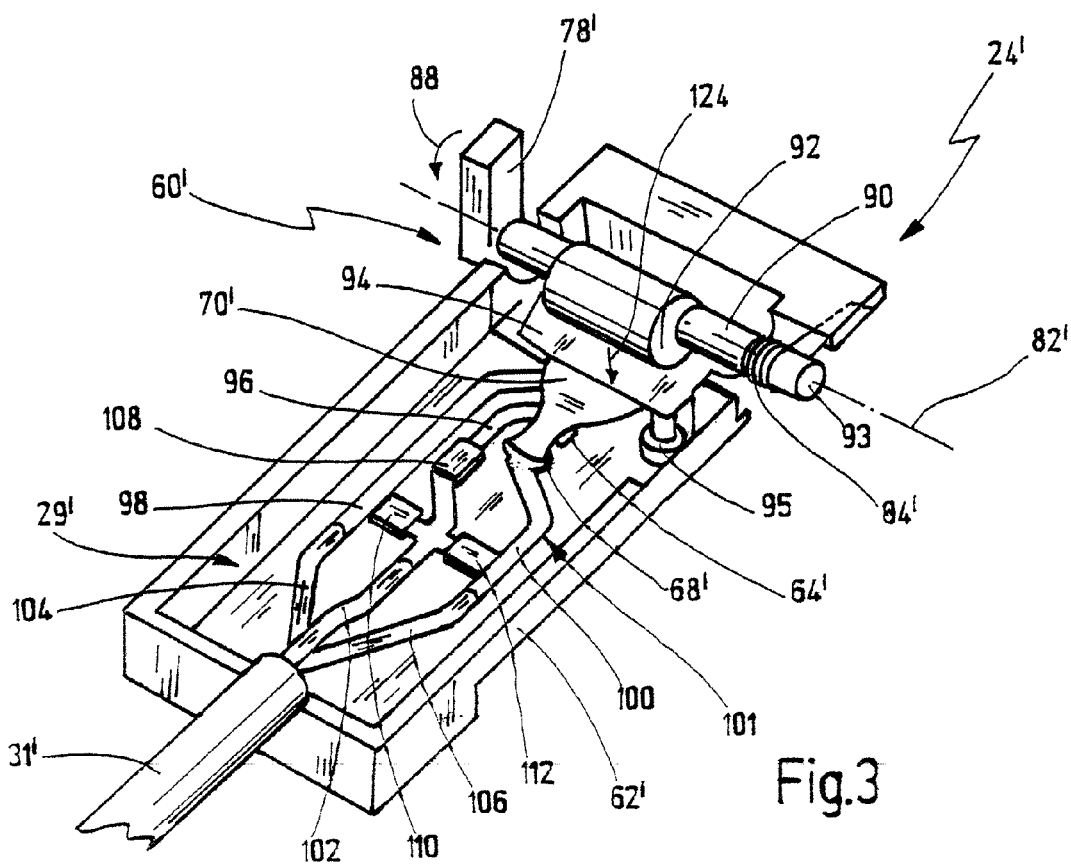

BUCKLE FOR A SAFETY BELT

CROSS-REFERENCE TO RELATED APPLICATIONS

This is a Continuation application of International patent application PCT/EP 2006/007919, filed Aug. 8, 2006, which claims the priority of German patent application DE 10 2005 041 029.4, filed Aug. 23, 2005.

BACKGROUND OF THE INVENTION

The present invention relates to a seat belt buckle for seat belts, having a housing, an opening for inserting a seat belt tongue, a locking device for locking the seat belt tongue, a release device for releasing the seat belt tongue from the lock, and having a sensor device for electrically sensing whether the seat belt tongue is locked, wherein the sensor device has a switch arrangement which can be activated by the seat belt tongue.

Such a seat belt buckle is generally known and is used in particular in motor vehicles. In most countries there is a requirement to wear a seat belt in motor vehicles and many motor vehicle manufacturers would like at least to remind the driver to consider whether or not he has put on his seat belt.

The sensor device senses whether the seat belt tongue is locked, that is to say whether the seat belt has been put on. A signal which is output by the sensor device can be used, in a superordinate control device, to actuate suitable indicating means and/or displays (acoustic and/or visual).

In the known seat belt buckles, the sensor means either have microswitches or Hall sensors for sensing whether the seat belt tongue is locked. When a Hall sensor is used, it is sensed inductively whether the seat belt tongue has been inserted sufficiently far into the opening in the seat belt buckle. If it has, it is possible to assume that the seat belt tongue is locked. If a microswitch is used, this position is sensed by activating the microswitch. In this context it is conceivable for the seat belt tongue to activate the microswitch directly. In the same way, it is known for a mechanical activation device to be provided which transmits a force exerted on the seat belt tongue during the insertion of the seat belt tongue onto the microswitch.

Both Hall sensors and microswitches are, however, comparatively expensive components. In the case of microswitches, durability is also a critical point owing to the large number of mechanically moving parts.

BRIEF SUMMARY OF THE INVENTION

In view of the background explained above, the object of the present invention is to specify an improved, in particular more cost-effective seat belt buckle for seat belts.

This object is achieved with a seat belt buckle for seat belts, having a housing, an opening for inserting a seat belt tongue, a locking device for locking the seat belt tongue, a release device for releasing the seat belt tongue from the lock, and having a sensor device for electrically sensing whether the seat belt tongue is locked, wherein the sensor device has a switch arrangement which can be activated by the seat belt tongue, wherein the switch arrangement has an electrically conductive snap-action plate that can be moved between a first switched position and a second switched position and a mechanical activation device which transmits a force exerted on the seat belt tongue during the insertion of the seat belt tongue onto the snap-action plate in order to move the snap-action plate from the first switched position into the second switched position, as a result of which an electrical contact element is closed or opened.

The object explained above is also achieved by the use of a snap-action plate as electrical switch for detecting a locked arrangement of a seat belt tongue in a seat belt buckle.

Snap-action plates have been known for a long time. In addition to the use as a "clicker frog" they are applied nowadays, for example, in keyboards for computers. Snap-action plates are generally composed of a high-quality spring steel which is gold-plated completely or at a suitable location or is contact-finished in some other way.

Generally, however, a snap-action plate can also be made from plastic and coated or otherwise provided with an electrically conducting material so that conductivity and the ability to close and open an electrical contact are provided.

In addition, snap-action plates are very cost-effective components, at least as large-scale manufactured components, such as is generally the case when they are applied in motor vehicles.

In addition, with contemporary fabrication methods and materials it is possible to ensure that the "snap-action property" of the snap-action plates is maintained largely unchanged over a long service life.

The use of a snap-action plate also has the advantage that the spring elasticity of the component for bringing about contact can be utilized by virtue of the fact that the snap-action plate is pressed against electrical contact elements by virtue of the spring force of said snap-action plate.

Even though the invention preferably provides for a mechanical activation device to be provided in order to convert the movement of the seat belt tongue to a movement of the snap-action plate, it is generally also possible to arrange the snap-action plate in such a way that it is activated directly by the seat belt tongue (in which case, if appropriate, an insulating and/or elastic component can be arranged between them).

The object is therefore completely achieved.

It is particularly advantageous if the snap-action plate has a first contact section which is in contact with a first electrical contact element in both the first and second switched positions, and a second contact section which is spaced apart from a second electrical contact element in the first switched position and which is in contact with the second electrical contact element in the second switched position.

Even though it is generally conceivable also to embody a snap-action plate with only a single contact section which is, for example, earthed, the embodiment of two contact sections is preferred since in this way an electrical current can flow via the snap-action plate. This leads to simpler electrical switching of the sensor device.

It is particularly advantageous here if the snap-action plate has a third contact section which is in contact with a third electrical contact element in the first switched position, and which is spaced apart from the third electrical contact element in the second switched position.

In this embodiment, the snap-action plate forms a type of "three pole switch" since the first electrical contact element is either electrically connected to the second electrical contact element or to the third electrical contact element, but never to both the second and third electrical contact elements.

Generally, the snap-action plate may be embodied as a tongue-like component (as in the case of a "clicker frog").

It is however particularly advantageous if the snap-action plate has a central section and a plurality of legs which extend from the central section, with the legs forming a first contact section, and with the central section forming a second contact section.

This embodiment makes it possible to mount the snap-action plate in a stable fashion in the housing in a structurally easy way and to establish a stable position for the central section both in the first and second switched positions.

In addition it is advantageous here if at least one of the legs has an extension section which forms a third contact section.

The extension section can then, for example in the first switched position, be in contact with a third electrical contact element. If the snap-action plate is activated and the central section is pressed against an electrical contact element (second electrical contact element), the extension section is lifted off here from the third electrical contact element by virtue of the property of the snap-action plate. As a result, the "three pole switch" property can easily be established.

According to a further preferred embodiment, the mechanical activation device has a pressure plate which is mounted on the housing so as to be movable in the switching direction, specifically between the snap-action plate and an activation element which transmits the seat belt tongue force.

In this way it is possible to ensure that forces are transmitted to the snap-action plate exclusively in the switching direction. In other words, the snap-action plate is not subjected to any transverse forces, something which could adversely affect its service life.

It is also advantageous if the mechanical activation device has a pressure element which bears directly against the snap-action plate and is manufactured from an elastically deformable material.

In this embodiment, the seat belt tongue force can be transmitted to the snap-action plate via the pressure element. The elastic property of the pressure element allows force peaks to be absorbed here. Friction which promotes abrasion can also be avoided on the plate. Its service life can therefore be prolonged.

It is particularly advantageous here if the pressure element is secured to the pressure plate.

In addition to the abovementioned advantages, this also results in simplified mounting.

According to a further preferred embodiment, the mechanical activation device has an activation element in the form of an eccentric which can be rotated about a rotational axis by means of the seat belt tongue force and has an eccentric section which acts on the snap-action plate.

An eccentric permits force to be transmitted from the seat belt tongue to the snap-action plate in a structurally simple manner and yet with a high level of mechanical strength.

It is additionally advantageous if the mechanical activation device has a rotational shaft which is mounted on the housing so as to be rotatable about a rotational axis and is connected to a lever which extends into the opening for the insertion of the seat belt tongue.

The lever is pivoted about the rotational axis when the seat belt tongue is inserted. The rotational shaft is rotated and its rotation can be deflected, for example by means of an eccentric section, into a movement for activating the snap-action plate.

However, a second lever for activating the snap-action plate, or some other suitable gear mechanism in the form of a rotation/translation transducer, can also be provided on the rotational shaft.

It is additionally advantageous if the mechanical activation device has a rotational shaft which is mounted on the housing so as to be rotatable about a rotational axis and is connected to an elastic restoring device which elastically pre-stresses the rotational shaft into the first switched position.

The elastic restoring device can be formed by an elastomer component. However, they are preferably formed by a spring component. The latter can, for example, engage on a lever which extends into the opening for the insertion of the seat belt tongue.

However, it is particularly advantageous if the elastic restoring device is formed by a spring which is mounted on the outside of a housing section and acts on a section of the rotational shaft which protrudes from the housing.

In this embodiment, the spring can, on the one hand, be easily mounted.

The housing section can be a housing section of the sensor device which is provided in the interior of the housing of the seat belt buckle.

It is also particularly advantageous in this embodiment that a leg spring which has a long service life can be used as the spring.

According to a further preferred embodiment, the sensor device has an electric conductor arrangement which is mounted on a housing section and has at least a first and a second electrical contact element.

The electrical conductor arrangement can be formed by an electrical printed circuit board. Alternatively, it can be formed by a flexible printed circuit board or flex film.

However, it is considered particularly advantageous if the conductor arrangement is a punched grating which is encapsulated with plastic by injection molding.

Punched gratings as such are known per se. They have a high mechanical strength and are additionally cost effective to manufacture, at least in large numbers.

Of course, the features which have been mentioned above and will be explained in more detail below can be used not only in the respectively specified combination but also in other combinations or alone without departing from the scope of the present invention.

BRIEF DESCRIPTION OF THE SEVERAL VIEWS OF THE DRAWING

Exemplary embodiments of the invention are illustrated in the drawing and will be explained in more detail in the following description. In the drawing:

FIG. 2 shows a schematic, perspective view of a seat belt buckle according to a further embodiment of the invention in the opened state;

FIG. 3 shows a schematic perspective view of a sensor device of the seat belt buckle in FIG. 2;

DETAILED DESCRIPTION OF THE INVENTION

Figure 1:
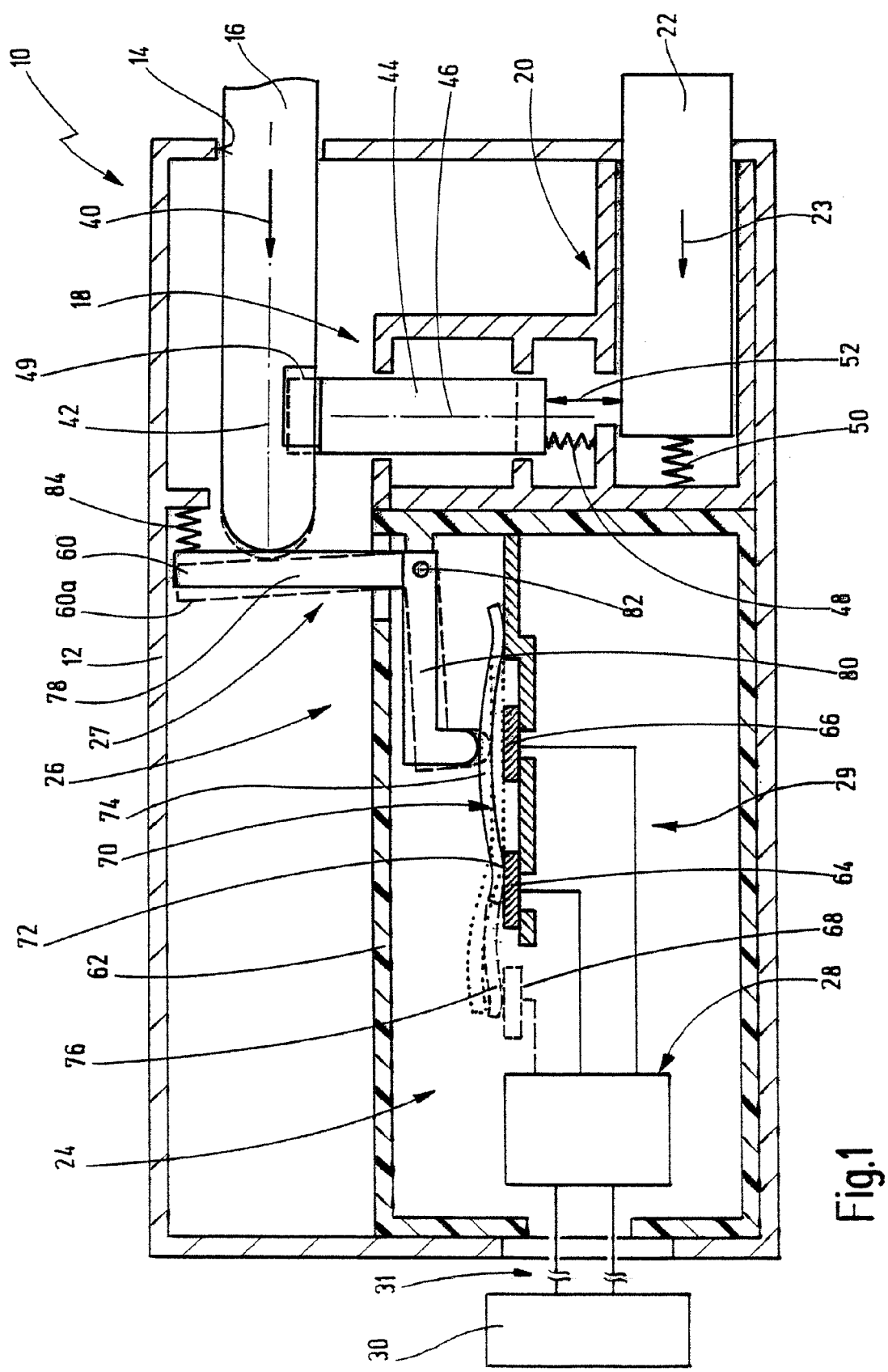
FIG. 1 shows a schematic longitudinal section through a seat belt buckle according to an embodiment of the present invention.

In FIG. 1, a first embodiment of a seat belt buckle according to the invention is generally designated by 10.

The seat belt buckle 10 serves as a seat belt buckle for a seat belt in a motor vehicle and has a housing 12.

An opening 14 for the insertion of a seat belt tongue 16 is formed on the housing 12. In addition, a locking device 18 is provided in the housing 12 in order to lock the seat belt tongue 16 (to close the seat belt).

Finally, a release device 20 is provided in the housing 12 in order to release the locked arrangement of the seat belt tongue 16 again (in order to take off the seat belt). The release device 20 has a pushbutton key 22 which is activated in order to release the locked arrangement of the seat belt tongue 16, as is indicated schematically at 23.

In addition, the seat belt buckle 10 has a sensor device 24 for electrically sensing whether the seat belt tongue 16 is locked.

The sensor device 24 has an electrical switch arrangement, designated in its entirety by 26. In addition, a mechanical activation device which is designated in its entirety by 27 is provided. The mechanical activation device 27 serves to transmit a force which is applied to the seat belt tongue 16 when the seat belt tongue 16 is inserted to the switch arrangement 26 in order, as a result, to activate an electrical contact element of the switch arrangement 26.

The sensor device 24 additionally has an electrical measuring circuit 28 which can be used, for example, as a diagnostic circuit. Such a diagnostic circuit can serve to monitor continuously the function of the switch arrangement 26, for example by impressing a very small current of several milliamperes by means of an electrical resistance arrangement of the measuring circuit 28. If any short circuits were to occur in the switch arrangement 26, this quiescent current would rise, which could then be correspondingly diagnosed.

The sensor device 24 additionally has a conductor arrangement 29 in order to connect the switch arrangement 26 to the electrical measuring circuit 28. The conductor arrangement 29 can, for example, be an electrical printed circuit board, a flexible printed circuit board (flex link), a punched grating or the like.

The sensor device 24 is connected to a superordinate control device 30 via a cable arrangement which is illustrated schematically at 31. The control device 30 can serve, for example, to impress the quiescent current for the electrical measuring circuit 28. However, the control device 30 principally serves to monitor and evaluate the switched state of the electrical switch arrangement 26. The control device 30 can be connected to a display device or an indicator device (for example visual and/or acoustic), not designated in more detail, in order to indicate the locked state of the seat belt tongue 16 which has been sensed by the sensor device 24.

The seat belt tongue 16 is inserted into the opening 14 in the housing 12 along a force and movement axis 42, as is illustrated schematically by an arrow 40.

The locking device 18 can be formed in a conventional way. The function of such locking device 18 is illustrated only schematically in FIG. 1. As a rule, the locking device 18 is connected via a high-strength arrangement (for example a seat belt stalk or the like) to the vehicle bodywork or the vehicle seat (which is in turn connected to the vehicle bodywork).

In principle, however, the locking device 18 has a bolt 44 which is mounted so as to be displaceable along a locking axis 46. The locking axis 46 is oriented transversely with respect to the force axis 42. The bolt 44 is prestressed against the inserted seat belt tongue 16 by means of a spring 48. As soon as a seat belt tongue 16 has reached its locked position, the bolt 44 is pressed into a locking recess 49 in the seat belt tongue 16. This is illustrated schematically in FIG. 1 by dashed lines.

In order to release the locked arrangement, the release device 20 is used. The pushbutton key 22 is prestressed counter to the activation direction 23 by means of a schematically illustrated spring arrangement 50.

In addition, the pushbutton key 22 is coupled to the bolt 44, which is indicated schematically by a double arrow 52. When the pushbutton key 22 is pressed down in the activation direction 23, the bolt 44 is pushed out of the recess 49 owing to the coupling 52, and the seat belt tongue 16 can be pulled out of the opening 14 or is ejected by means which are explained below.

The mechanical activation device 27 has an activation element 60 in the form of a lever which projects into the opening 14 or into the path of the seat belt tongue 16.

The activation element 60 is pivotably mounted on a housing section 62 of the sensor device 24 and is pivoted or deflected by the seat belt tongue 16 if the locked position is reached, as is illustrated schematically at 60'.

The switch arrangement 26 has a first electrical contact element 64, a second electrical contact element 66 and optionally (illustrated by dashed lines) a third electrical contact element 68.

The electrical contact elements 64, 66 (and if appropriate 68) are connected to the conductor arrangement 29 and/or form part of the conductor arrangement 29.

The switch arrangement 26 additionally has a snap-action plate 70. The snap-action plate 70 is generally preshaped in a curved fashion and has a first contact section 72 which is continuously in contact with the first electrical contact element 64.

In addition, the snap-action plate 70 has a second contact section 74 which, in an initial position, is spaced apart from the second electrical contact element 66. As soon as the seat belt tongue 16 is in the locked position, the snap-action plate 70 is, however, deflected by the mechanical activation device 27 in such a way that the second contact section 74 is in contact with the second electrical contact element 66.

The snap-action plate 70 is manufactured from an electrically conductive material, such as a spring steel. Alternatively, the snap-action plate 70 can be manufactured from a plastic and can be coated at least in certain sections with an electrically conductive material. When the second contact section 74 is in contact with the second electrical contact element 66, the first and second electrical contact elements 64, 66 are electrically connected to one another. This state can be evaluated by the control device 30. An indication requesting that the seat belt be fastened can then go out, for example.

In addition, the snap-action plate optionally has a third contact section 76. In the position of rest, the third contact section 76 is in contact with the optional, third electrical contact element 68. In the position of rest, the first electrical contact element 64 and the third electrical contact element 68 are therefore connected to one another. This state can also be evaluated. For example, the electrical connection between the first and third electrical contact elements 64, 68 can be identified as a state in which the seat belt tongue 16 is not yet in its locked position.

When the third contact section 76 and the third electrical contact element 68 are provided, the evaluation can therefore be made redundantly. In addition, different embodiments are possible with essentially the same layout.

For example, a control device 30 can be configured to identify the locked state of the seat belt tongue 16 when the connection between the electrical contact elements 64, 68 is broken.

The activation element 60 in the form of the lever arrangement has a first limb 78 which projects into the opening 14 or the path of the seat belt tongue 16. In addition, the activation element 60 has a second limb 80 which extends within the housing section 62 and bears on the upper side of the snap-action plate 70, or is arranged above it. The activation element 60 is mounted so as to be rotatable about a rotational axis 82, specifically on the housing section 62. The rotational axis 82 extends transversely with respect to the force axis 42.

In FIG. 1, dashed lines show the state in which the seat belt tongue 16 has reached the locked position. The activation element 60 has accordingly been deflected and the second limb 80 has pushed down the snap-action plate 70 (shown by dots) so that the second contact section 74 has come into contact with the second electrical contact element 66. At the same time, the third contact section 76 (if one is optionally provided) has been released from the third electrical contact element 68.

This change in the state of the electrical switch arrangement 26 can be evaluated by the control device 30 and be indicated by changing appropriate indications.

At 84, an elastic restoring device is shown which pulls the activation element 60 back into the initial position if the seat belt tongue 16 is pulled out of the seat belt buckle. Owing to the spring elastic property of the snap-action plate 70, the latter "snaps" back into the position of rest illustrated by solid lines in FIG. 1, in which position the second electrical contact element 66 and the second contact section 74 are electrically isolated from one another.

An alternative embodiment of a seat belt buckle according to the invention is shown in FIGS. 2 to 5 and is generally designated by 10'.

The seat belt buckle 10' corresponds generally to the seat belt buckle 10 in FIG. 1 in terms of design and method of functioning. Only differences are explained in the text which follows.

In FIG. 2 it is apparent that the sensor device 24' is accommodated in a housing section 62' which can be secured in the housing 12' of the seat belt buckle 10'. In this context, a lever of the activation element 60 protrudes from the housing section 62'. When the seat belt tongue 16' is inserted, the activation element 60 is deflected, as is shown at 88.

In addition, an elastic restoring device 84' (illustrated schematically) is arranged on the outside of the housing section 62'. The elastic restoring device 84' serves to move the activation element 60 back into its initial position as soon as the seat belt tongue 16' is removed from the seat belt buckle 10'.

The design of the sensor device 24' is illustrated in more detail in FIG. 3.

The activation element 60' has a rotational shaft 90 which is mounted so as to be rotatable about a rotational axis 82'. The rotational shaft 90 extends out of the housing section 62' at both of its ends. At one of its ends, a lever in the form of a limb 78' is provided on the rotational shaft 90. This limb 78' can also be seen in FIG. 2 and is deflected by the seat belt tongue 16.

In its central section, the rotational shaft 90 has an eccentric 92 which serves to activate the snap-action plate 70'.

Elastic restoring device 84' in the form of a leg spring is secured to the section 93 of the rotational shaft 90 which lies opposite and protrudes from the housing section 62'. A limb of the leg spring 84' is supported on the housing section 72' here.

A pressure plate 94 is arranged between the eccentric 92 and the snap-action plate 70'. The pressure plate 94 is mounted so as to be displaceable in the activation direction (switching direction) of the snap-action plate 70' by means of suitable bearings 95 (one of which is illustrated in FIG. 3). The pressure plate 94 ensures that the transverse component which is applied by the eccentric 92 is not transmitted to the snap-action plate 70'. In other words, the snap-action plate 70' is activated only in its activation direction, which is illustrated by an arrow 124 in FIGS. 3 and 5.

In the case of the sensor device 24', the conductor arrangement 29' of the sensor device 24 is formed by a punched grating arrangement 101, which has a first conductor 96, a second conductor 98 and a third conductor 100.

Figure 4:
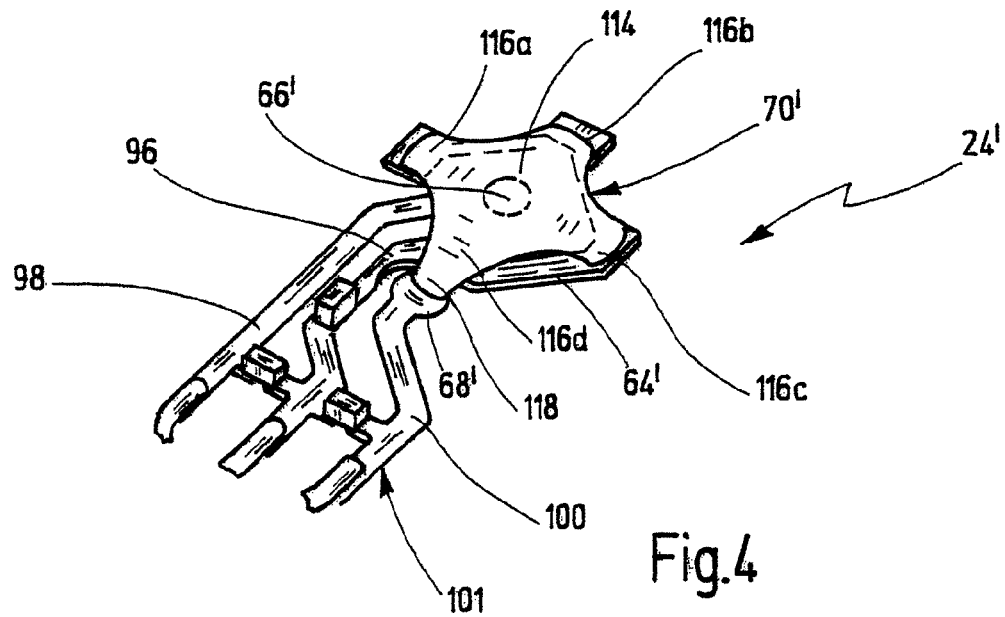
FIG. 4 shows a schematic, perspective view of a detail of the sensor device in FIG. 3.
Figure 5:
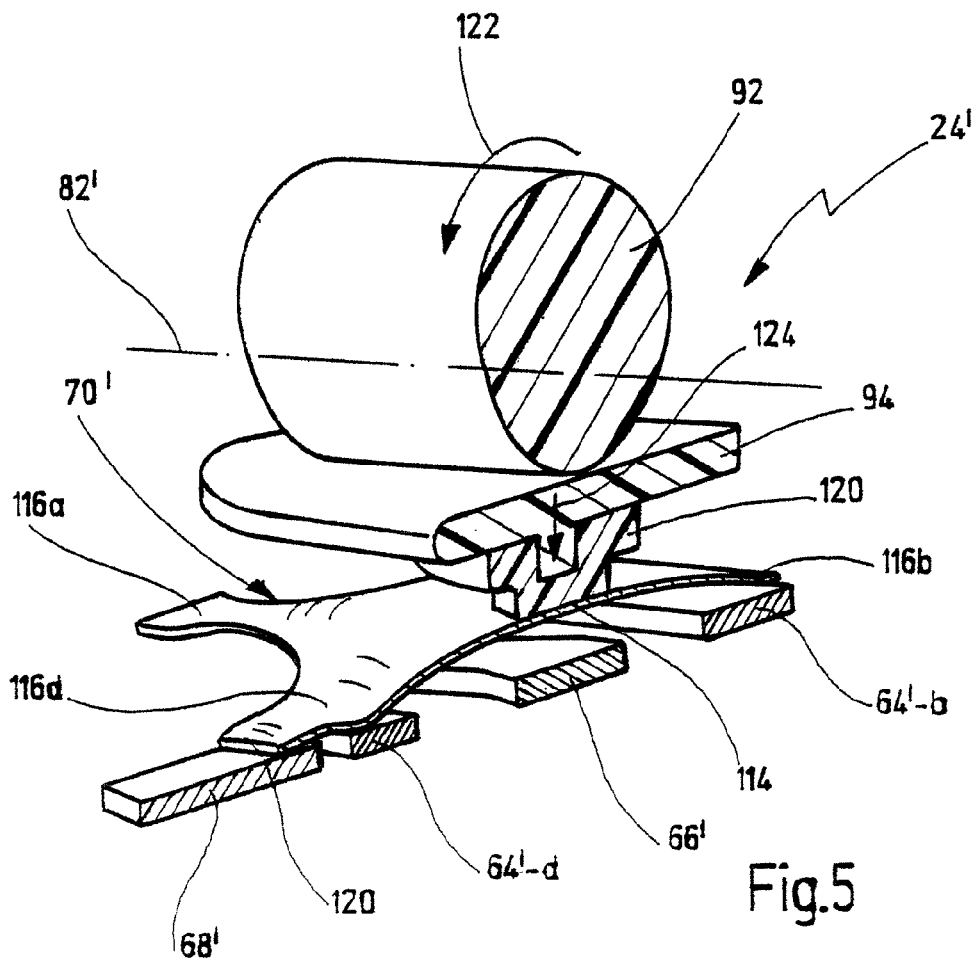
FIG. 5 shows a schematic, enlarged sectional view through the sensor device in FIGS. 3 and 4.

As is illustrated in FIGS. 3, 4 and 5, the first conductor 96 is connected to the first electrical contact element 64'. To be more precise, the end of the first conductor 96 forms the first electrical contact element 64'.

The second conductor 98 forms, at its end below the snap-action plate 70', the second electrical contact element 66'.

The third conductor 100 forms, at its end, the third electrical contact element 68'.

The three conductors 96, 98, 100 are connected via an electrical measuring circuit 28' to a cable arrangement 31'. The cable arrangement 31' has three wires 102, 104, 106.

The first wire 102 is connected to the first conductor 96. The second wire 104 is connected to the second conductor 98. The third wire 106 is connected to the third conductor 100.

The connection can be made, for example, by crimping, by welding or the like. Alternatively it is also possible for socket sections to be welded onto the conductors 96, 98, 100 or attached in some other way, which conductors 96, 98, 100 protrude out of the housing section 62' and can be plugged into the corresponding connection pins of the cable arrangement 31'.

The electrical measuring circuit 28 is formed by three resistors 108, 110, 112.

The first resistor 108 is arranged in the first conductor 96, that is to say between the first electrical contact element 64' and the first wire 102. The second electrical resistor 110 is arranged between the first conductor 96 and the second conductor 98, that is to say between the two wires 102, 104. In a corresponding way, the third electrical resistor 112 is arranged between the two conductors 96 and 100, that is to say between the wires 102, 106.

A quiescent current or a quiescent voltage can be applied to the wires 102, 104, 106 by the control device 30 (not shown in FIG. 3). Owing to the resistors 108, 110, 112, only a very small quiescent current (for example in the range <50 mA, preferably <20 mA) flows, and said quiescent current does not stress the vehicle battery. In the case of a short circuit of the conductors 96, 98, 100, the current would rise steeply, which can be detected by the control device 30. In this case, the applied voltage can be interrupted and a fault message or a fault indication can be output.

As is shown in particular in FIG. 4, the snap-action plate 70 has a central section 114 from which four legs 116a, 116b, 116c, 116d extend. The central section 114 forms the second contact section 74 here.

The electrical contact element 64' extends underneath the legs 116a, 116b, 116c, 116d so that the legs 116 all form the first electrical contact element 64'.

One leg, 116d, is provided with an extension section 118 which corresponds to the third contact section 76. In the state of rest the extension section 118 is in contact with the third electrical contact element 68'.

As is apparent in particular in FIG. 5, the pressure plate 94 is arranged between the eccentric 92 and the snap-action plate 70. Secured to the under-side of the pressure plate 94 is a pressure element which is made of an elastic material and bears directly against the upper side of the snap-action plate 70.

Forces which are exerted by the pressure plate 94 are therefore attenuated by the pressure plate 120. In addition, the friction on the top of snap-action plate 70' is reduced. Overall, the arrangement shown can extend the service life of the snap-action plate 70'.

FIG. 5 also shows that the leg 116b is located above a section 64'-b of the first electrical contact element 64 or is constantly in contact with it. In a corresponding way, the leg 116d is constantly in contact with a section 64'-d of the first electrical contact element 64'.

FIG. 5 also shows, at 122, a rotation of the rotational shaft 92, which rotation is initiated on the basis of a movement 88 of the limb 78'. As a result, the pressure plate 94 is moved downward perpendicularly with respect to the snap-action plate 70', as is shown schematically at 124.

The sensor device 24' is preferably manufactured as follows:

First, the punched grating is manufactured and is encapsulated by injection molding together with the housing section 62'. This gives the punched grating 101 the necessary stability. The punched grating can be formed before the encapsulation by injection molding in such a way that the conductors 96, 98, 100 are connected to one another. After the encapsulation by injection molding, the electrical insulation of the conductors 96, 98, 100 can be carried out by punching out connecting webs. The resistors can then be soldered or welded on. The wires 102, 104, 106 can also be welded on. The electrical contact elements 64', 66', 68' are exposed on the punched grating which is encapsulated by injection molding. The snap-action plate 70' is inserted, specifically into the bearings or guides 95, and the pressure plate 94 with the attached pressure element 120 is fitted onto said snap-action plate 70'. The rotational shaft 90 is then inserted and the limb spring 84' secured.

Then, the entire arrangement can be encapsulated by injection molding a second time, and the mobility of the rotational shaft, of the snap-action plate 70' etc. has to be ensured. Alternatively it is also possible to fit a cover onto the housing section 62', for example with a seal which is inserted between them.

In this way, the sensor device 24' can be sealed completely. It is possible, for example, to bring about a tight seal according to the standard EP65 so that extraneous liquids (cola, coffee etc.) cannot affect the functioning of the sensor device 24'.

What is claimed is:

1. A seat belt buckle for seat belts, the seat belt buckle comprising a housing, an opening for inserting a seat belt tongue, a locking device for locking the seat belt tongue, a release device for releasing the seat belt tongue from the locking device, and a sensor device for electrically sensing whether the seat belt tongue is locked, wherein the sensor device has a switch arrangement activated by the seat belt tongue, the switch arrangement comprising:

an electrically conductive snap-action plate that moves between a first switched position and a second switched position in response to a force applied to an upper side of the snap-action plate, the snap-action plate having a first contact section that is in contact with a first electrical contact element in both the first and second switched positions, a second contact section that is spaced apart from a second electrical contact element in the first switched position and that is in contact with the second electrical contact element in the second switched position, and a third contact section that is in contact with a third electrical contact element in the first switched position and that is spaced apart from the third electrical contact element in the second switched position; and a mechanical activation device that transmits a force exerted on the seat belt tongue during insertion of the seat belt tongue onto an upper side of the snap-action plate in order to move the snap-action plate from the first switched position into the second switched position.

2. The seat belt buckle according to claim 1, wherein the snap-action plate has a central section and a plurality of legs that extend from the central section, wherein one of the plurality of legs forms the first contact section, and wherein the central section forms the second contact section.

3. The seat belt buckle according to claim 2, wherein at least one of the plurality of legs has an extension section that forms the third contact section.

4. The seat belt buckle according to claim 1, wherein the mechanical activation device has a pressure plate that is mounted on the housing so as to be movable in a direction that transmits force to the upper side of the snap-action plate.

5. The seat belt buckle according to claim 4, wherein the pressure plate is movable between the snap-action plate and an activation element that transmits the force exerted on the seat belt tongue to the upper side of the snap-action plate.

6. The seat belt buckle according to claim 1, wherein the mechanical activation device has a pressure element that bears directly against the snap-action plate and is manufactured from an elastically deformable material.

7. The seat belt buckle according to claim 6, wherein the mechanical activation device has a pressure plate that is mounted on the housing so as to be movable in a direction that transmits force to the upper side of the snap-action plate, and wherein the pressure element is secured to the pressure plate.

8. The seat belt buckle according to claim 1, wherein the mechanical activation device has an activation element in the form of an eccentric that rotates about a rotational axis by means of the force exerted on the seat belt tongue and has an eccentric section that acts on the snap-action plate.

9. The seat belt buckle according to claim 1, wherein the mechanical activation device has a rotational shaft that is mounted on the housing so as to be rotatable about a rotational axis and is connected to a lever that extends into the opening for inserting the seat belt tongue.

10. The seat belt buckle according to claim 1, wherein the mechanical activation device has a rotational shaft that is mounted on the housing so as to be rotatable about a rotational axis and is connected to an elastic restoring device that elastically prestresses the rotational shaft into the first switched position.

11. The seat belt buckle according to claim 10, wherein the elastic restoring device comprises a spring that is mounted on the outside of a housing section and acts on a section of the rotational shaft that protrudes from the housing.

12. The seat belt buckle according to claim 1, wherein the sensor device has an electric conductor arrangement that is mounted on a housing section and includes at least the first electrical contact element and the second electrical contact element.

13. The seat belt buckle according to claim 12, wherein the conductor arrangement is a punched grating that is encapsulated with plastic by injection molding.

14. A method for sensing whether a seat belt tongue is in a locked position within a seat belt buckle, comprising:

transmitting a force via a mechanical activation device within a seat belt buckle housing by a seat belt tongue in a locked position within the seat belt housing to an upper surface of a snap-action plate, thereby moving the snap-action plate from a first switched position to a second switched position; and contacting a first electrical contact element of the seat belt buckle housing by a first contact section of the snap-action plate in both the first and second switched positions;

contacting a second electrical contact element of the seat belt buckle housing by a second contact section of the snap-action plate, the second contact section spaced apart from the second electrical contact element in the first position; and contacting a third electrical contact element of the seat belt buckle housing by a third contact section of the snap-action plate in the first switched position, the third contact section spaced apart from the third electrical contact element in the second switched position.

15. The method of claim 14, wherein the transmitting comprises rotating the mechanical activation device about a rotational shaft mounted on the seat belt buckle housing and connected to a lever that extends into an opening of the seat belt buckle housing that receives the seat belt tongue.

16. The method of claim 14, wherein the transmitting comprises rotating the mechanical activation device about a rotational shaft mounted on the seat belt buckle housing and connected to an elastic restoring device that elastically prestresses the rotational shaft into the first switched position.

17. A method of manufacturing a seat belt buckle, comprising:

disposing a snap-action plate having a first switched position and a second switched position within a seat belt buckle housing such that a first contact section of the snap-action plate is in contact with a first electrical contact element in both the first and the second switched positions, a second contact section of the snap-action plate is spaced apart from a second electrical contact element in the first position and is in contact with the second electrical contact element in the second switched position, and a third contact section of the snap-action plate is in contact with a third electrical contact element in the first switched position and is spaced apart from the third electrical contact element in the second switched position; and disposing a mechanical activation device within the seat belt buckle housing such that the mechanical activation device transmits a force exerted by a seat belt tongue in a locked position within the seat belt buckle to an upper surface of the snap-action plate, thereby moving the snap-action plate from the first switched position to the second switched position.

* * * * *